No. 683,305. Patented Sept. 24, 1901.
L. A. LEVIN.
CURB FOR SIDEWALKS, LAWNS, &c.
(Application filed July 21, 1900.)
(No Model.)
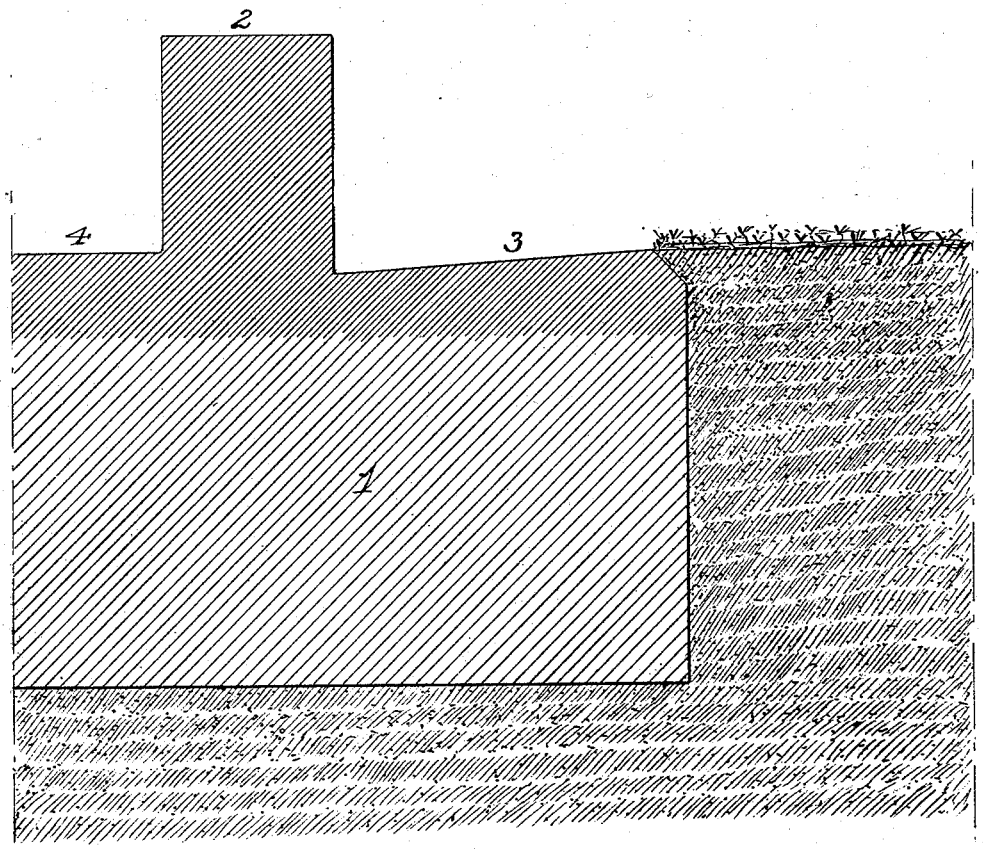
Witnesses:-
F. E. Bechtold
Louis H. T. Whitehead
Inventor:-
Louis A. Levin
by his Attorneys:-
Howson & Howson

UNITED STATES PATENT OFFICE.

LOUIS A. LEVIN, OF PHILADELPHIA, PENNSYLVANIA.

CURB FOR SIDEWALKS, LAWNS, &c.

SPECIFICATION forming part of Letters Patent No. 683,305, dated September 24, 1901.

Application filed July 21, 1900. Serial No. 24,411. (No model.)

*To all whom it may concern:*

Be it known that I, LOUIS A. LEVIN, a citizen of the United States, residing in Philadelphia, Pennsylvania, have invented certain Improvements in Curbs for Sidewalks, Lawns, &c., of which the following is a specification.

The object of my invention is to so construct a curb for use between a lawn and a garden-path, a sidewalk, or the like as to provide a gutter bordering the lawn and permit the use of a lawn-mower for cutting the grass close up to the edge of the lawn. This object I attain in the manner hereinafter set forth, reference being had to the accompanying drawing, in which is represented in transverse section a lawn-bordering curb constructed in accordance with my invention.

In preparing cement or asphalt sidewalks, garden-paths, or the like alongside of lawns it is common to provide the walk or path at each edge with a raised coping; but in such cases the lawn extends close up to the outer side of this raised coping. Hence it is impossible to cut or trim the grass at the edge of the lawn by means of a lawn-mower, the raised coping interfering with that portion of the machine which projects in front of the revolving knives.

In carrying out my invention, therefore, I provide a lawn-bordering curb 1 with a raised coping 2 some distance inwardly from the outer edge of the same, so as to provide between said outer edge and the coping a depressed surface 3 of any desired width, whereby the coping is located at such a distance from the edge of the lawn that it will not interfere with the ready cutting or trimming of the grass up to the edge of the lawn by means of the mower, the depressed surface 3 also serving as a gutter or drain and for this purpose being, if desired, inclined downwardly from the outer edge toward the coping. The curb is composed of a mass of concrete faced with cement and resting on a bed of broken stone or cinders, and it may be formed in any desired lengths or may be built up of blocks having the desired cross-sectional form. The inwardly-projecting sidewalk or path portion 4 forming the gutter on that side may have its upper surface at any desired level below the coping 2 in respect to the outwardly-projecting portion 3 of the curb.

Having thus described my invention, I claim and desire to secure by Letters Patent—

A lawn-bordering curb consisting of a coping having on one side a depressed portion forming a gutter and on the other side a depressed portion extending inwardly from the coping on the side next to the lawn, said depressed portion being of sufficient width to permit a lawn-mower to travel over the edge of the lawn to cut the grass close to the said edge, substantially as described.

In testimony whereof I have signed my name to this specification in the presence of two subscribing witnesses.

LOUIS A. LEVIN.

Witnesses:
F. E. BECHTOLD,
JOS. H. KLEIN.